United States Patent
Jiang

(10) Patent No.: US 11,936,605 B2
(45) Date of Patent: Mar. 19, 2024

(54) MESSAGE PROCESSING METHOD, APPARATUS AND ELECTRONIC DEVICE

(71) Applicant: Beijing Bytedance Network Technology Co., Ltd., Beijing (CN)

(72) Inventor: Zerui Jiang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/863,254

(22) Filed: Jul. 12, 2022

(65) Prior Publication Data

US 2022/0353227 A1    Nov. 3, 2022

Related U.S. Application Data

(63) Continuation of application No. PCT/CN2020/126435, filed on Nov. 4, 2020.

(30) Foreign Application Priority Data

Jan. 20, 2020    (CN) .......................... 202010065743.2

(51) Int. Cl.
G06F 15/16    (2006.01)
H04L 51/06    (2022.01)
H04L 51/212    (2022.01)

(52) U.S. Cl.
CPC ............ H04L 51/212 (2022.05); H04L 51/06 (2013.01)

(58) Field of Classification Search
CPC .............................. H04L 51/212; H04L 51/06
See application file for complete search history.

(56) References Cited

U.S. PATENT DOCUMENTS 5,200,893 A * 4/1993 Ozawa .................. G06F 40/211
715/235
8,353,035 B1 * 1/2013 Coomer .............. H04L 63/1416
713/188

(Continued)

FOREIGN PATENT DOCUMENTS

CN    107832276 A    3/2018
CN    109271768 A    1/2019

(Continued)

OTHER PUBLICATIONS

International Search Report issued in corresponding International Application No. PCT/CN2020/126435 dated Feb. 1, 2021.

(Continued)

*Primary Examiner* — Oleg Survillo
(74) *Attorney, Agent, or Firm* — Astute IP Law Group

(57) ABSTRACT

Embodiments of the present disclosure provide a message processing method, an apparatus, and an electronic device, which belong to the technical field of computer applications. The method includes: obtaining a comment message sent by a sending terminal; performing a preset type of detection on the comment message; if the comment message passes the detection, sending the comment message to the receiving terminal, so that the receiving terminal displays the comment message; if the comment message fails the detection, not sending the comment message to the receiving terminal. Through the solution of the present disclosure, the detection and screening strategy for the comment messages is added, a total amount of the comment messages is reduced, the message processing solution is optimized, and the user experience is improved.

11 Claims, 2 Drawing Sheets

(56) References Cited

U.S. PATENT DOCUMENTS

| | | | |
|---|---|---|---|
| 10,216,803 B2 * | 2/2019 | Ball | H04L 51/216 |
| 2004/0177271 A1 * | 9/2004 | Arnold | G06Q 10/107 |
| | | | 706/46 |
| 2007/0174045 A1 * | 7/2007 | Kao | G06F 40/295 |
| | | | 704/4 |
| 2009/0164484 A1 * | 6/2009 | Horowitz | H04N 21/4532 |
| 2010/0083112 A1 * | 4/2010 | Dawson | G06Q 10/00 |
| | | | 715/706 |
| 2011/0040576 A1 * | 2/2011 | Madan | G06Q 10/10 |
| | | | 705/3 |
| 2012/0303358 A1 * | 11/2012 | Ducatel | G06F 40/30 |
| | | | 704/9 |
| 2013/0196697 A1 * | 8/2013 | Lew | H04L 51/56 |
| | | | 455/466 |
| 2013/0246972 A1 * | 9/2013 | Tateno | G06F 16/955 |
| | | | 715/825 |
| 2015/0312632 A1 * | 10/2015 | Hoctor | H04N 21/462 |
| | | | 725/14 |
| 2016/0004687 A1 * | 1/2016 | Kurian | G06F 40/242 |
| | | | 704/10 |
| 2017/0032270 A1 * | 2/2017 | Lee | G06N 5/02 |
| 2017/0193093 A1 * | 7/2017 | Byron | G06F 40/205 |
| 2019/0163740 A1 * | 5/2019 | Ackermann | G06F 40/205 |
| 2020/0210053 A1 * | 7/2020 | Baunach | G06F 3/0482 |
| 2021/0133243 A1 * | 5/2021 | Gangwar | G06F 16/9536 |

FOREIGN PATENT DOCUMENTS

| | | |
|---|---|---|
| CN | 109977403 A | 7/2019 |
| CN | 110020057 A | 7/2019 |
| CN | 110209795 A | 9/2019 |
| CN | 111327913 A | 6/2020 |
| JP | 2002117135 A | 4/2002 |
| JP | 2007265368 A | 10/2007 |
| JP | 2008276355 A | 11/2008 |
| JP | 2014109794 A | 6/2014 |
| JP | 2018022321 A | 2/2018 |

OTHER PUBLICATIONS

Office Action in JP2022542651, dated Sep. 26, 2023, 10 pages.

\* cited by examiner

MESSAGE PROCESSING METHOD, APPARATUS AND ELECTRONIC DEVICE

CROSS-REFERENCE TO RELATED APPLICATIONS

This application is a continuation application of International Application No. PCT/CN2020/126435, filed on Nov. 4, 2020, which claims priority to Chinese patent application No. CN 202010065743.2, filed on Jan. 20, 2020. Both of the aforementioned applications are hereby incorporated by reference in their entireties.

TECHNICAL FIELD

The present disclosure relates to the field of data processing technology, and in particular to a message processing method, an apparatus and an electronic device.

BACKGROUND

With a development of computer technology, in real-time platforms such as video broadcasting and live broadcasting platforms, a real-time participation of users in comments has become increasingly popular. As the number of participating users increases, so does the number of user comments. An existing processing solution for comment messages is to receive comment messages sent by the users and directly display all the received messages on an audience client, which results in complicated comment content, and a quality of comment content cannot be guaranteed, and a user experience will be impacted.

It can be seen that the existing message processing solutions lack a comment-controlling strategy, which leads to a technical problem of the poor user experience.

SUMMARY

In view of this, embodiments of the present disclosure provide a message processing method, an apparatus and an electronic device, which at least partially solve the problems existing in the prior art.

In a first aspect, an embodiment of the present disclosure provides a message processing method, including:
  obtaining a comment message sent by a sending terminal;
  performing a preset type of detection on the comment message;
  if the comment message passes the detection, sending the comment message to a receiving terminal, so that the receiving terminal displays the comment message;
  if the comment message fails the detection, not sending the comment message to the receiving terminal.

According to a specific implementation of the embodiment of the present disclosure, the preset type of detection includes at least one of vocabulary detection, account detection, and model detection.

According to a specific implementation of the embodiment of the present disclosure, if the preset type of detection is the account detection;
  a step of the performing the preset type of detection on the comment message includes:
  collecting a real-time frequency of sending the comment message by the sending terminal;
  if the real-time frequency is greater than a preset frequency, determining that the sending terminal is a preset terminal, and determining that the comment message fails the account detection.

According to a specific implementation of the embodiment of the present disclosure, if the preset type of detection is the vocabulary detection;
  the step of the performing the preset type of detection on the comment message includes:
  judging whether there is at least one keyword in a first vocabulary set in the comment message;
  if there is the at least one keyword in the first vocabulary set in the comment message, determining that the comment message fails the vocabulary detection;
  and/or,
  if the preset type of detection is the model detection;
  the step of the performing the preset type of detection on the comment message includes:
  performing a word segmentation processing on the comment message, and judging whether there is at least one keyword in a preset second vocabulary set within a preset number of adjacent phrases;
  if there is the at least one keyword in the second vocabulary set in the comment message, determining that the comment message fails the model detection.

According to a specific implementation of the embodiment of the present disclosure, the preset type of detection includes at least two of the vocabulary detection, the account detection, and the model detection;
  the step of the performing the preset type of detection on the comment message includes:
  performing each type of detection on the comment message in turn;
  if the comment message passes all types of detection, determining that the comment message passes the detection;
  if the comment message fails all types of detection, determining that the comment message fails the detection.

According to a specific implementation of the embodiment of the present disclosure, the preset type of detection includes at least two of the vocabulary detection, the account detection, and the model detection;
  the step of the performing the preset type of detection on the comment message includes:
  performing all types of detection on the comment message in parallel at the same time;
  if the comment message passes all types of detection, determining that the comment message passes the detection;
  if the comment message fails all types of detection, determining that the comment message fails the detection.

According to a specific implementation of the embodiment of the present disclosure, after the step of performing the preset type of detection on the comment message, the method further includes:
  if the comment message fails the detection, sending indication information that the comment message fails the detection to the sending terminal.

According to a specific implementation of the embodiment of the present disclosure, a step of the sending the indication information that the comment message fails the detection to the sending terminal includes:
  sending indication information that the comment message fails the detection, and is only visible to the sending terminal to the sending terminal; or, sending indication information that the comment message fails the detection and cannot be displayed to the sending terminal.

In a second aspect, an embodiment of the present disclosure provides a message processing apparatus, including:

an obtaining module, configured to obtain a comment message sent by a sending terminal;

a detecting module, configured to perform a preset type of detection on the comment message;

a sending module, configured to:

if the comment message passes the detection, send the comment message to a receiving terminal, so that the receiving terminal displays the comment message;

if the comment message fails the detection, not send the comment message to the receiving terminal.

According to a specific implementation of the embodiment of the present disclosure, the detection module is configured to:

perform each type of detection on the comment message in turn;

if the comment message passes all types of detection, determine that the comment message passes the detection;

if the comment message fails all types of detection, determine that the comment message fails the detection.

According to a specific implementation of an embodiment of the present disclosure, the preset type of detection includes at least two of vocabulary detection, account detection, and model detection;

the detection module is configured to:

perform all types of detection on the comment message in parallel same time;

if the comment message passes all types of detection, determine that the comment message passes the detection;

if the comment message fails all types of detection, determine that the comment message fails the detection.

In a third aspect, an embodiment of the present disclosure also provides an electronic device, the electronic device includes:

at least one processor; and, a memory communicatively connected with the at least one processor;

where, the memory stores instructions that can be executed by the at least one processor, and the instructions are executed by the at least one processor, so that the at least one processor can execute the message processing method in the foregoing first aspect or any implementation of the first aspect.

In a fourth aspect, an embodiment of the present disclosure also provides a non-transitory computer-readable storage medium that stores computer instructions, the computer instructions are used to enable a computer execute the message processing method in the foregoing first aspect or any implementation of the first aspect.

In a fifth aspect, an embodiment of the present disclosure also provides a computer program product, the computer program product includes a computer program stored on a non-transitory computer-readable storage medium, the computer program includes program instructions, and when the program instruction is executed by a computer, the computer is enabled to execute the message processing method in the foregoing first aspect or any implementation manner of the first aspect.

The message processing solution in the embodiment of the present disclosure includes: obtaining a comment message sent by a sending terminal; performing a preset type of detection on the comment message; if the comment message passes the detection, sending the comment message to a receiving terminal, so that the receiving terminal displays the comment message; if the comment message fails the detection, not sending the comment message to the receiving terminal. Through the solution of the present disclosure, a detection and screening strategy for comment messages is added, the number of comment messages is reduced, the message processing solution s optimized, and the user experience is improved.

BRIEF DESCRIPTION OF DRAWINGS

In order to explain technical solutions of embodiments of the present disclosure more clearly, the following will briefly introduce drawings needed in the embodiments. Obviously, the drawings in the following description are only some embodiments of the present disclosure. For those of ordinary skill in the art, without creative work, other drawings can be obtained from these drawings.

DESCRIPTION OF EMBODIMENTS

Figure 1:
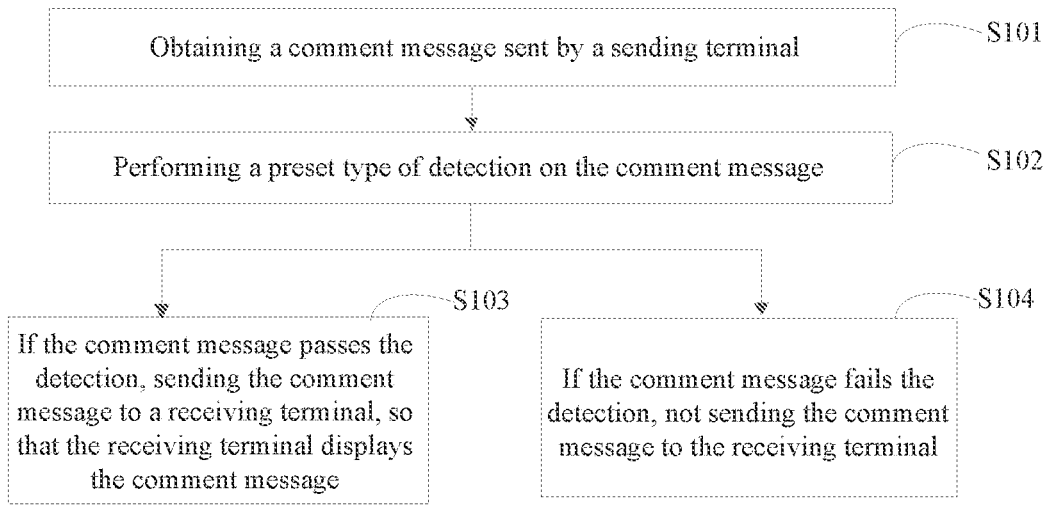
FIG. 1 is a schematic flowchart of a message processing method provided by an embodiment of the disclosure.

Embodiments of the present disclosure will be described in detail below with reference to drawings.

Implementations of the present disclosure will be described through specific examples as follows, and those skilled in the art can easily understand other advantages and effects of the present disclosure from content disclosed in this specification. Obviously, the described embodiments are only a part of the embodiments of the present disclosure, rather than all the embodiments. The present disclosure can also be implemented or applied through other different specific embodiments, and various details in this specification can also be modified or changed based on different viewpoints and applications without departing from a spirit of the present disclosure. It should be noted that, in the case of no conflict, the following embodiments and features in the embodiments can be combined with each other. Based on the embodiments in the present disclosure, all other embodiments obtained by those ordinary skilled in the art without creative work shall fall within a protection scope of the present disclosure.

It should be noted that various aspects of the embodiments within a scope of appended claims are described below. It should be obvious that the aspects described here can be embodied in a wide variety of forms, and any specific structure and/or function described here are only illustrative. Based on the present disclosure, those skilled in the art should understand that one aspect described here can be implemented independently of any other aspects, and two or more of these aspects can be combined in various ways. For example, any number of aspects set forth here can be used to implement apparatus and/or practical methods. In addition, structures and/or functionalities other than one or more of the aspects set forth here may be used to implement the apparatus and/or practical method.

It should also be noted that illustrations provided in the following embodiments only illustrate a basic idea of the present disclosure in a schematic manner, and the illustration only show components related to the present disclosure instead of drawing according to the number, shape, and size of the components in actual implementation. The pattern, number, and ratio of each component during actual implementation can be changed, and a component layout pattern of them may also be more complicated.

In addition, in the following description, specific details are provided to facilitate a thorough understanding of the examples. However, those skilled in the art will understand that the aspects can be practiced without these specific details.

The embodiment of the present disclosure provides a message processing method. The message processing method provided in this embodiment can be executed by a computing apparatus, and the computing apparatus can be implemented as software, or as a combination of software and hardware, and the computing apparatus can be integrated in a server, terminal device and so forth.

Referring to FIG. 1, a message processing method provided by an embodiment of the present disclosure includes:

S101: obtaining a comment message sent by a sending terminal:

an application body of the message processing method provided in this embodiment may be a server, which is used to implement a process of processing the comment message sent by at least one client interacting with the server. The comment message involved here refers to user generated content (referred to as UGC) such as comments and barrage in scenarios such as live broadcast platforms. The client that can send the comment messages is defined as the sending terminal, and the client that can receive the comment messages is defined as the receiving terminal. It should be noted that the same client can also have functions of sending and receiving the comment messages at the same time, that is, the same client can be both the sending terminal and receiving terminal.

In this embodiment, the sending terminal generates the comment message according to input operations of the user, and sends the generated comment message to the server. Obviously, when sending the comment message to the server, the sending terminal can also send identification information of the sending terminal, or identity information such as an avatar and nickname of the user of the sending terminal at the same time.

S102: performing a preset type of detection on the comment message;

a preset type of detection algorithm is preset in the server to perform the preset type detection on the received comment message, so as to determine whether the received comment message can be output and displayed. According to comment screening requirements, in an embodiment, the preset type of detection may include at least two of vocabulary detection, account detection, and model detection.

Among them, the vocabulary detection may be to detect whether there are predetermined vocabularies contained in a preset vocabulary among all the vocabularies of the comment message. If the preset type of detection is the vocabulary detection, in step S102, the performing the preset type of detection on the comment message may include:

judging, whether there is at least one keyword in a first vocabulary set in the comment message;

if there is at least one keyword in the first vocabulary set in the comment message, determining that the comment message fails the vocabulary detection.

The server pre-stores the first vocabulary set, and the first vocabulary set contains multiple predetermined keywords that cannot be displayed in the comment message. The vocabulary in the comment message will be traversed, and if the at least one keyword in the corresponding first vocabulary set appears, it is determined that the comment message failed the vocabulary detection. For example, it is determined that the predetermined keyword is ABC. If the comment message is "We do support ABC . . . ", it is determined that there is the predetermined keyword "ABC" in the comment message, and the comment message fails the vocabulary detection. Obviously, in some scenarios, a keyword occurrences threshold can also be limited, and only when the number of occurrences of predetermined words in the comment message is equal to or more than the threshold, it is determined that the comment message fails the vocabulary detection.

In addition, the model detection can detect whether the predetermined word is implied in all the vocabularies of the comment message. The model detection is mainly aimed at a situation where the predetermined keyword is intermittently arranged to avoid the vocabulary detection. If the preset type of detection is the model detection, in the step S102, the performing the preset type of detection on the comment message may include:

performing a word segmentation processing on the comment message, and judging whether there is at least one keyword in a preset second vocabulary set within a preset number of adjacent phrases;

if there is the at least one keyword in the second vocabulary set in the comment message, determining that the comment message fails the model detection.

The word segmentation algorithms and the combination algorithms are pre-stored in the server, as well as a set of the predetermined keywords for the model detection, which is defined as the second vocabulary set. After the comment message is performed with the word segmentation process, it is determined whether there are the predetermined words in multiple of the adjacent phrases, and if so, it is determined that the comment message fails the model detection. For example, if it is determined that the predetermined keyword is ABC, if the comment message is "We do support A's B is C, . . . ,", then the model detection algorithm would be used to filter out the predetermined keywords "ABC" that interval exist in the comment message, and the comment message failed the model detection.

The preset number for combining the vocabulary can be set to 2 to 10 word segmentation units, so as to achieve a higher detection accuracy and avoid misjudgments that may be caused by screening phrases are too long.

The above-mentioned account detection is to detect whether the sending terminal or the user who sends the comment message is a normal account, and this type of detection is mainly aimed at the situation of automatic comments by robots. If the preset type of detection is the account detection, in step S102, the performing the preset type of detection on the comment message may include:

collecting a real-time frequency of sending the comment messages by the sending terminal;

if the real-time frequency is greater than a preset frequency, determining that the sending terminal is a preset terminal, and determining that the comment message fails the account detection:

The comments by the normal sending terminal or the comments message sent by the user will be counted and defined as the preset frequency. Upon receiving the comment message sent by the sending terminal, the real-time frequency of the sending terminal is detected. If the real-time frequency of the sending terminal is greater than the preset frequency, it is determined that the sending terminal is the preset terminal such as a robot, and it is determined that the comment message sent by the sending terminal fails the account detection.

Obviously, in order to reduce the detection operation for the preset terminals, if it is determined that a certain sending terminal is the preset terminal, the comment message of the preset terminal can be rejected, or every time the comment message of the preset terminal is received, it is directly determined to fail the detection.

S103: if the comment message passes the detection, sending the comment message to a receiving terminal, so that the receiving terminal displays the comment message;

S104: if the comment message fails the detection, not sending the comment message to the receiving terminal.

After the server performs the preset type of detection on the received comment message, if it is determined that the received comment message passes the detection, then the comment message will be sent to the receiving terminal for display. Conversely, if the comment message fails the detection, the comment message will not be sent to the receiving terminal, and the comment message will not be displayed on the receiving terminal. It should be noted that the receiving terminal here includes all clients that belong to the same live broadcast platform as the sending terminal and can receive the comment messages, and the receiving terminal may include the sending terminal.

In the message processing method provided by the foregoing embodiment of the present disclosure, the server performs the preset types of detection on the comment messages sent by the sending terminal, so as to screen out the comment messages that pass the detection and send them to the receiving terminal for display. In this way, the comment messages that cannot be displayed can be effectively filtered, a total amount of the comment messages is reduced, a message processing scheme is optimized, and the user experience of the client is improved.

According to another specific implementation of an embodiment of the present disclosure, the preset type of detection includes at least two of the vocabulary detection, the account detection, and the model detection;
a step of the performing the preset type of detection on the comment message includes:
performing each type of detection on the comment message in turn;
if the comment message passes all types of detection, determining that the comment message passes the detection;
if the comment message fails all types of detection, determining that the comment message fails the detection.

Figure 2:
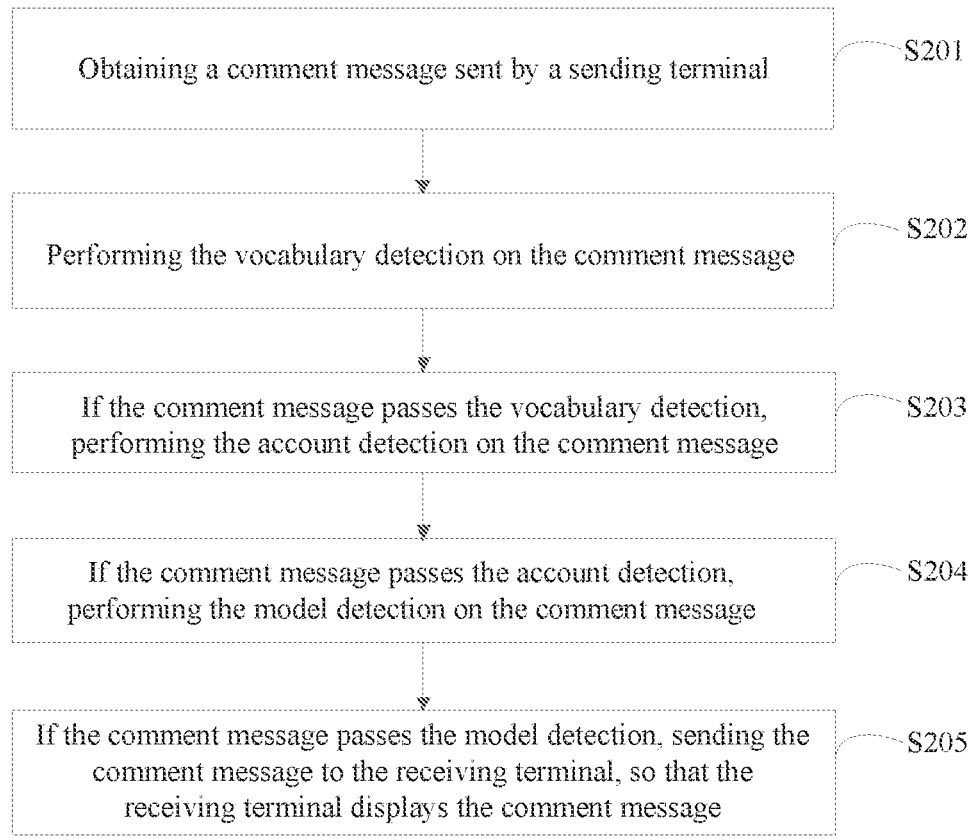
FIG. 2 is a schematic flowchart of another message processing method provided by another embodiment of the disclosure.

In this embodiment, the preset types of detection include the vocabulary detection, the account detection, and the model detection. As shown in FIG. 2, a detection process is:

S201: obtaining a comment message sent by a sending terminal;
a server receives the comment message sent by the sending terminal, and the comment message involved refers to user-generated content such as comments and barrage in scenarios such as a live broadcast platform.

In this embodiment, the sending terminal generates the comment message according to an input operation of users, and sends the generated comment message to the server. Obviously, when sending the comment message to the server, the sending terminal can also send identification information of the sending terminal, or send identity information such as an avatar and a nickname of the user of the sending terminal at the same time.

S202: performing the vocabulary detection on the comment message;
the preset types of detection algorithm are preset in the server to perform the preset type detection on the received comment message, so as to determine whether the received comment message can be output and displayed. In this embodiment, the preset types of detection include the vocabulary detection, the account detection, and the model detection.

The vocabulary detection can detect whether there are predetermined vocabularies contained in the preset vocabulary among all the vocabulary of the comment message.

S203: if the comment message passes the vocabulary detection, performing the account detection on the comment message;
if the comment message passes the vocabulary detection, continue to perform a next step of detection operation on the comment message, that is, the account detection. Conversely, if the comment message fails the vocabulary detection, it is directly determined that the comment message fails the detection and cannot be displayed, and a subsequent process of the account detection will not continue.

S204: if the comment message passes the account detection, performing the model detection on the comment message;
if the comment message passes the account detection, then continue to perform the model detection on the comment message. Conversely, if the comment message fails the account detection, it is directly determined that the comment message fails the detection and cannot be displayed, and the subsequent process of the model detection will not continue.

S205: if the comment message passes the model detection, sending the comment message to the receiving terminal, so that the receiving terminal displays the comment message.

If the comment message passes the model detection, it can be determined that the comment message has passed an overall detection process, the comment message can be sent to the receiving terminal, and the receiving terminal can receive the comment message and display it.

In this embodiment, each of the preset type of detection is performed on the comment message in turn. After one type of detection is passed, a next type of detection will be performed. If a current type of detection is failed, it is directly determined that the comment message fails the detection, and the comment message is no longer sent to the receiving terminal, so as to effectively reduce the detection process. Obviously, a sequence of the above-mentioned three or more types of detection can be exchanged and is not limited.

According to another specific implementation of an embodiment of the present disclosure, the preset type of detection includes at least two of the vocabulary detection, the account detection, and the model detection;
the step of the performing the preset type of detection on the comment message includes:
performing all types of detection on the comment message in parallel at the same time;
if the comment message passes all types of detection, determining that the comment message passes the detection;

if the comment message fails all types of detection, determining that the comment message fails the detection.

Figure 3:
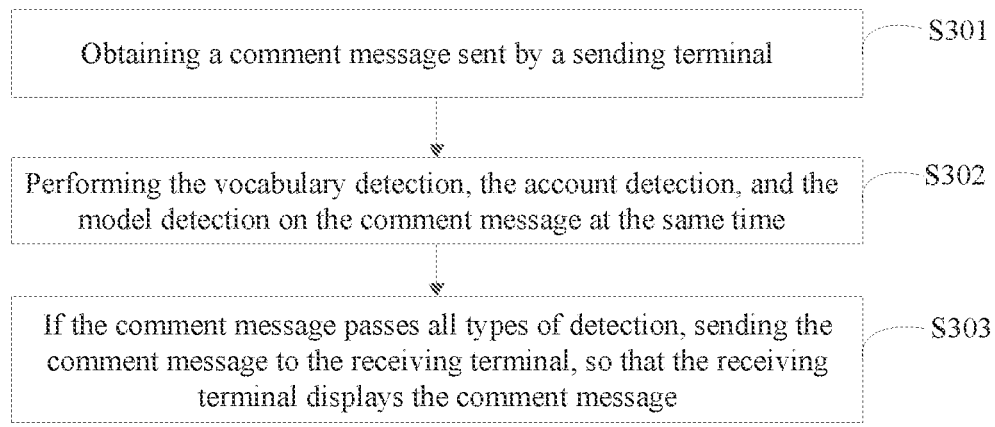
FIG. 3 is a schematic flowchart of another message processing method provided by another embodiment of the present disclosure.

In this embodiment, the preset types of detection include the vocabulary detection, the account detection, and the model detection. As shown in FIG. 3, a detection process is:

S301: obtaining a comment message sent by a sending terminal;

the sending terminal generates a comment message according to a input operation of users, and sends the generated comment message to a server.

Obviously, when sending the comment message to the server, the sending terminal can also send identification information of the sending terminal, or identity information such as an avatar and a nickname of the user of the sending terminal at the same time.

S302: performing the vocabulary detection, the account detection, and the model detection on the comment message at the same time;

the preset types of detection algorithms are preset in the server to perform the preset type detection on the received comment message, so as to determine whether the received comment message can be output and displayed.

In an embodiment, the preset type of detection may include the vocabulary detection, the account detection, and the model detection, and the vocabulary detection, account detection and model detection are performed on the comment message at the same time, so as to effectively reduce detection time.

S303: if the comment message passes all types of detection, sending the comment message to the receiving terminal, so that the receiving terminal displays the comment message.

In this embodiment, each of the preset type of detection is performed on the comment message at the same time, and the comment message will be sent to the receiving terminal only when all three types of detection pass, which greatly reduces the detection time and improves comment timeliness on a client and improve user experience.

In addition, on the basis of the foregoing embodiment, according to a specific implementation of the embodiment of the present disclosure, after the step of the performing the preset type of detection on the comment message, the method may further include:

if the comment message fails the detection, sending indication information indicating that the comment message fails the detection to the sending terminal.

Further, the step of the sending the indication information indicating that the comment message fails the detection to the sending terminal includes:

sending indication information that the comment message fails the detection and is only visible to the sending terminal to the sending terminal; or, sending indication information that the comment message fails the detection and cannot be displayed to the sending terminal.

In this embodiment, solutions after the comment message fails the detection are limited. If the server determines that the comment message fails the detection, it will send the indication information that the comment message is only visible to itself or cannot be displayed on the sending terminal, in order to inform the user of the sending terminal that a result of the detection is failed, so that content of the comment message can be adjusted.

Figure 4:
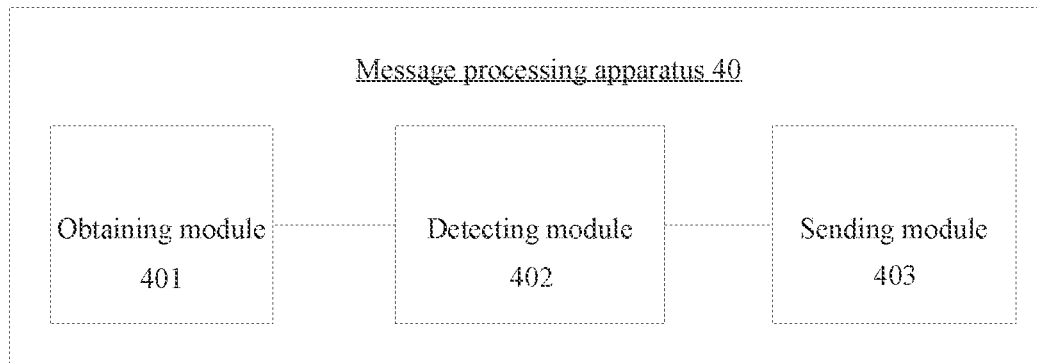
FIG. 4 is a schematic structural diagram of a message processing apparatus provided by an embodiment of the disclosure.

Corresponding to the above method embodiment, referring to FIG. 4, an embodiment of the present disclosure also provides a message processing apparatus 40, including:

an obtaining module 401, configured to obtain a comment message sent by a sending terminal;

a detecting module 402, configured to perform a preset type of detection on the comment message;

a sending module 403, configured to:

if the comment message passes the detection, sending the comment message to the receiving terminal, so that the receiving terminal displays the comment message;

if the comment message fails the detection, not sending the comment message to the receiving terminal.

According to a specific implementation of the embodiment of the present disclosure, the detecting module 402 may be configured to:

perform each type of detection on the comment message in turn;

if the comment message passes all types of detection, determine that the comment message passes the detection;

if the comment message fails all types of detection, determine that the comment message fails the detection.

According to another specific implementation of the embodiment of the present disclosure, the preset type of detection includes at least two of vocabulary detection, account detection, and model detection;

the detecting module 402 can be configured to:

perform all types of detection on the comment message in parallel at the same time;

if the comment message passes all types of detection, determine that the comment message passes the detection;

if the comment message fails all types of detection, determine that the comment message fails the detection.

The apparatus shown in FIG. 4 can correspondingly execute the content in the foregoing method embodiment. For parts that are not described in detail in this embodiment can refer to the content recorded in the foregoing method embodiment, and will not be elaborate herein.

Figure 5:
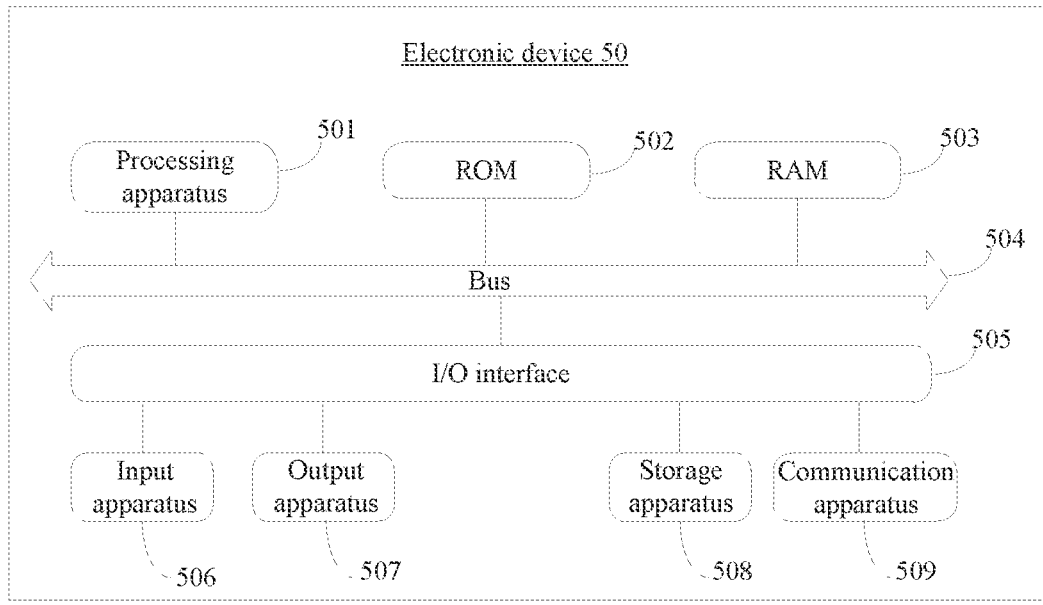
FIG. 5 is a schematic diagram of an electronic device provided by an embodiment of the disclosure.

Referring to FIG. 5, an embodiment of the present disclosure also provides an electronic device 50, which includes:

at least one processor; and, a memory communicatively connected with the at least one processor;

where, the memory stores instructions executable by the at least one processor, and the instructions are executed by the at least one processor, so that the at least one processor can execute the message processing method in the foregoing method embodiment.

An embodiment of the present disclosure also provide a non-transitory computer-readable storage medium that stores computer instructions, the computer instruction are used to enable a computer to execute the message processing method in the foregoing method embodiment.

An embodiment of the present disclosure also provide a computer program product, the computer program product includes a computer program stored on a non-transitory computer-readable storage medium, the computer program includes program instructions, when the program instructions are executed by a computer, enables the computer to execute the message processing method in the foregoing method embodiment.

Referring now to FIG. 5, it shows a schematic structural diagram of an electronic device 50 suitable for implementing embodiments of the present disclosure. The electronic devices in the embodiments of the present disclosure may include, but are not limited to, mobile phones, notebook computers, digital broadcast receivers, PDAs (personal digital assistants), PADs (tablets), PMPs (portable multimedia players), vehicle-mounted terminals (for example, Car navigation terminals) and other mobile terminals and fixed terminals such as digital TVs, desktop computers and so forth. The electronic device shown in FIG. 5 is only an example, and should not bring any limitation to functions and usage scope of the embodiments of the present disclosure.

As shown in FIG. 5, the electronic device 50 may include a processing device (such as a central processing unit, a graphics processor and so forth) 501, which may executes various appropriate actions and processing according to programs that stored in a read-only memory (ROM) 502 or programs that loaded from a storage device 508 into a random access memory (RAM) 503. In the RAM 503, various programs and data required for operations of the electronic device 50 are also stored. The processing device 501, the ROM 502, and the RAM 503 are connected to each other through a bus 504. An input/output (I/O) interface 505 is also connected to the bus 504.

Generally, the following devices can be connected to the I/O interface 505: including: an input devices 506 such as touch screens, touch panels, keyboards, mice, image sensors, microphones, accelerometers, gyroscopes and so forth; an output device 507 such as liquid crystal displays (LCD), speakers, vibrators and so forth; a storage device 508 such as magnetic tapes, hard disks and so forth; and a communication device 509. The communication device 509 may allow the electronic device 50 to perform wireless or wired communication with other devices to exchange data. Although the figure shows the electronic device 50 with various devices, it should be understood that it is not required to implement or provide all the devices as shown, and it may alternatively be implemented or provided with more or fewer devices.

In particular, according to an embodiment of the present disclosure, the process described above with reference to the flowchart can be implemented as a computer software program. For example, the embodiments of the present disclosure include a computer program product, which includes a computer program carried on a computer-readable medium, and the computer program contains program code for executing the method shown in the flowchart. In such an embodiment, the computer program may be downloaded and installed from the network through the communication device 509, or installed from the storage device 508, or installed from the ROM 502. The computer program executes the above-mentioned functions defined in the method of the embodiment of the present disclosure are when executed by the processing device 501.

It should be noted that the above-mentioned computer-readable medium in the present disclosure may be a computer-readable signal medium or a computer-readable storage medium, or any combination of the two. The computer-readable storage medium may be, for example, but not limited to, an electrical, magnetic, optical, electromagnetic, infrared, or semiconductor system, apparatus, or device, or a combination of any of the above. More specific examples of the computer-readable storage media may include, but are not limited to: electrical connections with one or more wires, portable computer disks, hard disks, random access memory (RAM), read-only memory (ROM), erasable Programmable read-only memory (EPROM or flash memory), optical fiber, portable compact disk read-only memory (CD-ROM), optical storage device, magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, and a computer-readable program code is carried therein. The propagated data signal can take many forms, including but not limited to electromagnetic signals, optical signals, or any suitable combination of the above. The computer-readable signal medium may also be any computer-readable medium other than the computer-readable storage medium, and the computer-readable signal medium may send, propagate or transmit the program that used by or in combination with the instruction execution system, apparatus, or device. The program code contained on the computer-readable medium can be transmitted by any suitable medium, including but not limited to: wire, optical cable, RF (radio frequency) and so forth, or any suitable combination of the above.

The above-mentioned computer-readable medium may be included in the above-mentioned electronic device; or it may exist alone without being assembled into the electronic device.

The foregoing computer-readable medium carries one or more programs, and when the foregoing one or more programs are executed by the electronic device, the electronic device can implement the solutions provided by the foregoing method embodiments.

Alternatively, the computer-readable medium carries one or more programs, and when the one or more programs are executed by the electronic device, the electronic device can implement the solutions provided by the foregoing method embodiments.

The computer program code used to perform the operations of the present disclosure may be written in one or more programming languages or a combination thereof. The above-mentioned programming languages include object-oriented programming languages such as Java, Smalltalk, C++, and also conventional procedural programming language such as "C" language or similar programming language. The program code can be executed entirely on the user's computer, partly on the user's computer, executed as an independent software package, partly on the user's computer and partly executed on a remote computer, or entirely executed on the remote computer or a server. In the case of involving the remote computer, the remote computer can be connected to the user's computer through any kind of network, including a local area network (LAN) or a wide area network (WAN), or it can be connected to an external computer (for example, using an Internet service provider to connect through the Internet).

Flowcharts and block diagrams in the drawings illustrate possible architectures, functions, and operations of a system, method, and computer program product according to various embodiments of the present disclosure. In this regard, each block in the flowchart or block diagram can represent a module, program segment, or parts of code, and the module, program segment, or part of code contains one or more executable instructions for realizing specified logic functions. It should also be noted that, in some alternative implementations, the functions marked in the block may also occur in a different order from the order marked in the drawings. For example, two blocks shown one after the other can actually be executed substantially in parallel, or they can sometimes be executed in the reverse order, which depending on the functions involved. It should also be noted that each block in the block diagram and/or flowchart, and the combination of the blocks in the block diagram and/or flowchart, can be implemented by a dedicated hardware-based system that performs the specified functions or operations, or it can be realized by a combination of the dedicated hardware and computer instructions.

Units involved in the embodiments described in the present disclosure can be implemented in software or hardware. In which, names of the unit does not constitute a limitation on the unit itself under certain circumstances. For example, the first obtaining unit can also be described as "a unit for obtaining at least two Internet Protocol addresses."

It should be understood that each part of the present disclosure can be implemented by hardware, software, firmware, or a combination thereof.

The above are only specific implementations of the present disclosure, but a protection scope of the present disclosure is not limited thereto. Any changes or substitutions that can be easily thought of by those skilled in the art within a technical scope disclosed in the present disclosure should be included within the protection scope of the present disclosure. Therefore, the protection scope of the present disclosure should be subject to the protection scope of the claims.

What is claimed is:

1. A message processing method, comprising:
   obtaining a comment message sent by a sending terminal;
   performing a preset type of detection on the comment message;
   if the comment message passes the detection, sending the comment message to a receiving terminal, so that the receiving terminal displays the comment message;
   if the comment message fails the detection, not sending the comment message to the receiving terminal;
   wherein the preset type of detection comprises vocabulary detection and model detection; and
   wherein the step of the performing the preset type of detection on the comment message comprises:
   judging whether there is at least one keyword in a first vocabulary set in the comment message;
   if there is the at least one keyword in the first vocabulary set in the comment message, determining that the comment message fails the vocabulary detection;
   when the comment message passes the vocabulary detection, performing a word segmentation processing on the comment message to obtain a preset number of adjacent phrases, and judging whether intermittently arranged characters contained in the preset number of adjacent phrases are capable of forming at least one keyword in a preset second vocabulary set; and
   if the intermittently arranged characters contained in the preset number of adjacent phrases are capable of forming the at least one keyword in the second vocabulary set, determining that the comment message contains the at least one keyword that cannot be displayed in the comment message and fails the model detection.

2. The method according to claim 1, wherein after the step of performing the preset type of detection on the comment message, the method further comprises:
   if the comment message fails the detection, sending indication information indicating that the comment message fails the detection to the sending terminal.

3. The method according to claim 2, wherein a step of sending the indication information indicating that the comment message fails the detection to the sending terminal comprises:
   sending indication information indicating that the comment message fails the detection, and is only visible to the sending terminal to the sending terminal; or,
   sending indication information indicating that the comment message fails the detection and cannot be displayed to the sending terminal.

4. The method according to claim 1, wherein the preset type of detection further comprises account detection;
   the step of the performing the preset type of detection on the comment message further comprises:
   collecting a real-time frequency of sending the comment message by the sending terminal;
   if the real-time frequency is greater than a preset frequency, determining that the sending terminal is a preset terminal, and determining that the comment message fails the account detection.

5. The method according to claim 1, wherein the preset type of detection further comprises account detection, and the step of the performing the preset type of detection on the comment message further comprises:
   when the comment message passes the model detection, performing the account detection;
   if the comment message passes the account detection, determining that the comment message passes the detection; or
   if the comment message fails the account detection, determining that the comment message fails the detection.

6. A message processing apparatus, comprising:
   at least one processor; and
   a memory communicatively connected with the at least one processor;
   the at least one processor executes computer-executable instructions stored in the memory to cause the at least one processor to:
   obtain a comment message sent by a sending terminal;
   perform a preset type of detection on the comment message;
   if the comment message passes the detection, send the comment message to a receiving terminal, so that the receiving terminal displays the comment message;
   if the comment message fails the detection, not send the comment message to the receiving terminal;
   wherein the preset type of detection comprises vocabulary detection and model detection; and
   wherein to perform the preset type of detection on the comment message, the at least one processor is further configured to:
   judge whether there is at least one keyword in a first vocabulary set in the comment message;
   if there is the at least one keyword in the first vocabulary set in the comment message, determine that the comment message fails the vocabulary detection;
   when the comment message passes the vocabulary detection, perform a word segmentation processing on the comment message to obtain a preset number of adjacent phrases, and judge whether intermittently arranged characters contained in the preset number of adjacent phrases are capable of forming at least one keyword in a preset second vocabulary set; and
   if the intermittently arranged characters contained in the preset number of adjacent phrases are capable of forming the at least one keyword in the second vocabulary set, determine that the comment message contains the at least one keyword that cannot be displayed in the comment message and fails the model detection.

7. The apparatus according to claim 6, wherein the at least one processor is further configured to:
if the comment message fails the detection, send indication information indicating that the comment message fails the detection to the sending terminal.

8. The apparatus according to claim 7, wherein the at least one processor is further configured to:
send indication information indicating that the comment message fails the detection, and is only visible to the sending terminal to the sending terminal; or,
send indication information indicating that the comment message fails the detection and cannot be displayed to the sending terminal.

9. The apparatus according to claim 6, wherein the preset type of detection further comprises account detection;
the at least one processor is further configured to:
collect a real-time frequency of sending the comment message by the sending terminal;
if the real-time frequency is greater than a preset frequency, determine that the sending terminal is a preset terminal, and determine that the comment message fails the account detection.

10. The apparatus according to claim 6, wherein the preset type of detection further comprises account detection, and the at least one processor is further configured to:
when the comment message passes the model detection, perform the account detection;
if the comment message passes the account detection, determine that the comment message passes the detection; or
if the comment message fails the account detection, determine that the comment message fails the detection.

11. A non-transitory computer-readable storage medium, wherein the non-transitory computer-readable storage medium stores computer instructions, the computer instruction is used to enable a computer to:
obtain a comment message sent by a sending terminal;
perform a preset type of detection on the comment message;
if the comment message passes the detection, send the comment message to a receiving terminal, so that the receiving terminal displays the comment message;
if the comment message fails the detection, not send the comment message to the receiving terminal;
wherein the preset type of detection comprises vocabulary detection and model detection; and
wherein to perform the preset type of detection on the comment message, the computer instruction is further used to enable the computer to:
judge whether there is at least one keyword in a first vocabulary set in the comment message;
if there is the at least one keyword in the first vocabulary set in the comment message, determine that the comment message fails the vocabulary detection;
when the comment message passes the vocabulary detection, perform a word segmentation processing on the comment message to obtain a preset number of adjacent phrases, and judge whether intermittently arranged characters contained in the preset number of adjacent phrases are capable of forming at least one keyword in a preset second vocabulary set;
if the intermittently arranged characters contained in the preset number of adjacent phrases are capable of forming the at least one keyword in the second vocabulary set, determine that the comment message contains the at least one keyword that cannot be displayed in the comment message and fails the model detection.

* * * * *